(12) United States Patent
Pattie et al.

(10) Patent No.: US 7,261,256 B2
(45) Date of Patent: Aug. 28, 2007

(54) VARIABLE-DUCT SUPPORT ASSEMBLY

(75) Inventors: Jody H. Pattie, Marysville, WA (US); Todd King, Seattle, WA (US)

(73) Assignee: The Boeing Company, Chicago, IL (US)

( * ) Notice: Subject to any disclaimer, the term of this patent is extended or adjusted under 35 U.S.C. 154(b) by 142 days.

(21) Appl. No.: 10/708,864

(22) Filed: Mar. 29, 2004

(65) Prior Publication Data

US 2005/0211847 A1    Sep. 29, 2005

(51) Int. Cl.
B64C 1/00    (2006.01)
(52) U.S. Cl. .................................................. 244/129.1
(58) Field of Classification Search .............. 248/68.1, 248/69, 70; 174/48, 49; 244/129.1; 224/19, 224/310; 138/107, 106
See application file for complete search history.

(56) References Cited

U.S. PATENT DOCUMENTS

| | | | | | |
|---|---|---|---|---|---|
| 2,375,513 | A | * | 5/1945 | Bach | 248/59 |
| 2,502,714 | A | * | 4/1950 | Garnett | 248/537 |
| 3,226,069 | A | * | 12/1965 | Clarke | 248/73 |
| 3,292,886 | A | * | 12/1966 | Rovinsky | 248/49 |
| 3,486,725 | A | * | 12/1969 | Hidassy | 248/68.1 |
| 3,633,857 | A | * | 1/1972 | Logan | 248/62 |
| 3,968,323 | A | * | 7/1976 | Blanchet | 174/135 |
| D242,114 | S | * | 11/1976 | Lange | D8/373 |
| 4,119,285 | A | * | 10/1978 | Bisping et al. | 248/72 |
| 4,397,436 | A | * | 8/1983 | Lyon et al. | 248/68.1 |
| 4,407,479 | A | * | 10/1983 | Combe | 248/59 |
| 4,417,711 | A | * | 11/1983 | Madej | 248/74.4 |
| 4,601,447 | A | * | 7/1986 | McFarland | 248/49 |
| 4,609,171 | A | * | 9/1986 | Matsui | 248/74.3 |
| 4,638,966 | A | * | 1/1987 | Ford | 248/62 |
| 4,702,401 | A | * | 10/1987 | Graber et al. | 224/536 |
| 4,934,635 | A | | 6/1990 | Sherman | |
| 4,960,253 | A | | 10/1990 | Perrault et al. | |
| 4,997,148 | A | | 3/1991 | Sherman | |
| 5,014,940 | A | | 5/1991 | Sherman | |

(Continued)

OTHER PUBLICATIONS

UNISTRUT® "Cushioining and Clamping Products" Catalog (4 pages), Tyco Electrical & Metal Products, Wayne, MI, date not available.

(Continued)

*Primary Examiner*—Timothy D. Collins
(74) *Attorney, Agent, or Firm*—Ostrager Chong Flaherty & Broitman P.C.

(57) ABSTRACT

One advantageous embodiment of the present invention is a variable-duct support assembly (14) for mounting one or more ducts (12a-12c) thereon. This variable-duct support assembly (14) includes one or more rails (18) each having a groove (40). Each groove (40) has one or more pairs of support brackets (20) positioned therein for supporting a proximal surface (22) of the ducts (12a-12c). The support brackets (20) are coupled to one or more flexible bands (24) and utilized for clamping the duct (12a-12c) between the support brackets (20) and the flexible bands (24). The flexible bands (24) are intended to contact and wrap around a distal surface (26) of the duct (12a-12c) so as to distribute a load substantially across the distal surface (26). Likewise, the support brackets (20) each include support portions (28) for distributing the load substantially across the proximal surface (22) of each duct (12a-12c).

22 Claims, 9 Drawing Sheets

U.S. PATENT DOCUMENTS

| | | | | |
|---|---|---|---|---|
| 5,052,605 | A | * | 10/1991 | Johansson .................... 224/324 |
| 5,215,281 | A | * | 6/1993 | Sherman .................... 248/74.1 |
| 5,332,179 | A | * | 7/1994 | Kuffel et al. .............. 248/74.3 |
| 5,443,246 | A | * | 8/1995 | Peterson .................... 269/283 |
| 5,542,631 | A | * | 8/1996 | Bruno ........................ 248/58 |
| 5,855,342 | A | * | 1/1999 | Hawkins et al. ........... 248/68.1 |
| 5,957,416 | A | * | 9/1999 | Sellati ........................ 248/61 |
| 6,164,507 | A | * | 12/2000 | Dean et al. .................. 224/324 |
| 6,464,169 | B1 | | 10/2002 | Johnson et al. |
| 6,719,247 | B1 | * | 4/2004 | Botting ....................... 248/60 |

OTHER PUBLICATIONS

"Accessoires de Cablage—Wiring Accessories", Ampenol Air LB, Edition Jan. 2001, Courbevoie Cedex, France (16 pages).

\* cited by examiner

VARIABLE-DUCT SUPPORT ASSEMBLY

BACKGROUND OF INVENTION

The present invention relates generally to ductwork, and more particularly to a variable-duct support assembly for mounting ducts of various shapes and sizes onto an airframe or other suitable structures.

Aircraft manufacturers are well known for producing aircrafts having HVAC systems or various other systems with ductwork integrated therein. This ductwork typically is comprised of a series of cylindrical tubing or ducts for passing air throughout the aircraft. Typically, each duct requires a plurality of support assemblies for mounting the duct to the airframe of the aircraft. Moreover, each support assembly can be comprised of a substantial number of parts and have a somewhat complex construction. In this way, these support assemblies can result in expensive material costs, lengthy installation times, and high labor costs associated therewith.

Additionally, existing support assemblies can be sized for mounting only specific ducts of certain shapes and sizes. In other words, differently sized or shaped ducts can each require its own separate support assembly for attaching the respective duct to the airframe. This condition can require new tooling and further increase the time required to install the ductwork.

It would therefore be desirable to provide a variable-duct support assembly and method for installing ductwork, which provides for ease of use and common components, as well as a reduction of costs.

SUMMARY OF INVENTION

One embodiment of the present invention is a variable-duct support assembly for mounting one or more ducts thereon. This variable-duct support assembly includes one or more rails each having a groove. These grooves have one or more pairs of support brackets positioned therein for supporting a proximal surface of the ducts. The support brackets are coupled to one or more flexible bands and utilized for clamping the duct between the support brackets and the flexible bands. The flexible bands contact and wrap around the duct so as to distribute the load substantially across the distal surface. Likewise, the support brackets each include support portions for distributing the load substantially across a proximal surface of each duct.

One advantage of the invention is that a variable-duct support assembly is provided that can distribute a load substantially across the surface of a duct and decrease the likelihood of inadvertently deforming the ducts during installation of the ductwork.

Another advantage of the invention is that a variable-duct support assembly is provided that has a robust and common construction for mounting ducts of various shapes and sizes thereon, which decreases installation time and minimizes labor costs associated therewith.

Still another advantage of the invention is that a variable-duct support assembly is provided that can eliminate the need for new tooling associated with new configurations, e.g. differently shaped or sized ducts.

Yet another advantage of the invention is that a variable-duct assembly is provided that has substantially few parts thereby simplifying the manufacture of the assembly, decreasing the costs associated therewith, and improving the installation of ducts onto the assembly.

The features, functions, and advantages can be achieved independently and in various embodiments of the present invention or may be combined in yet other embodiments.

BRIEF DESCRIPTION OF DRAWINGS

For a more complete understanding of this invention, reference should now be made to the embodiments illustrated in greater detail in the accompanying drawings and described below by way of examples of the invention.

DETAILED DESCRIPTION

In the following figures the same reference numerals will be used to illustrate the same components in the various views. The embodiments described herein employ features where the context permits, e.g. when a specific result or advantage of the claimed invention is desired. However, a variety of other embodiments are contemplated having different combinations of the described features, having features other than those described herein, or even lacking one or more of the described features. Specifically, the embodiments described herein implement a variable-duct support assembly for installing ductwork in an aircraft. Yet, it is contemplated that the variable-duct support assembly can be utilized for various other suitable applications and environments, e.g. other vehicles and buildings. For these reasons, it is understood that the invention can be carried out in various modes.

Figure 1A:
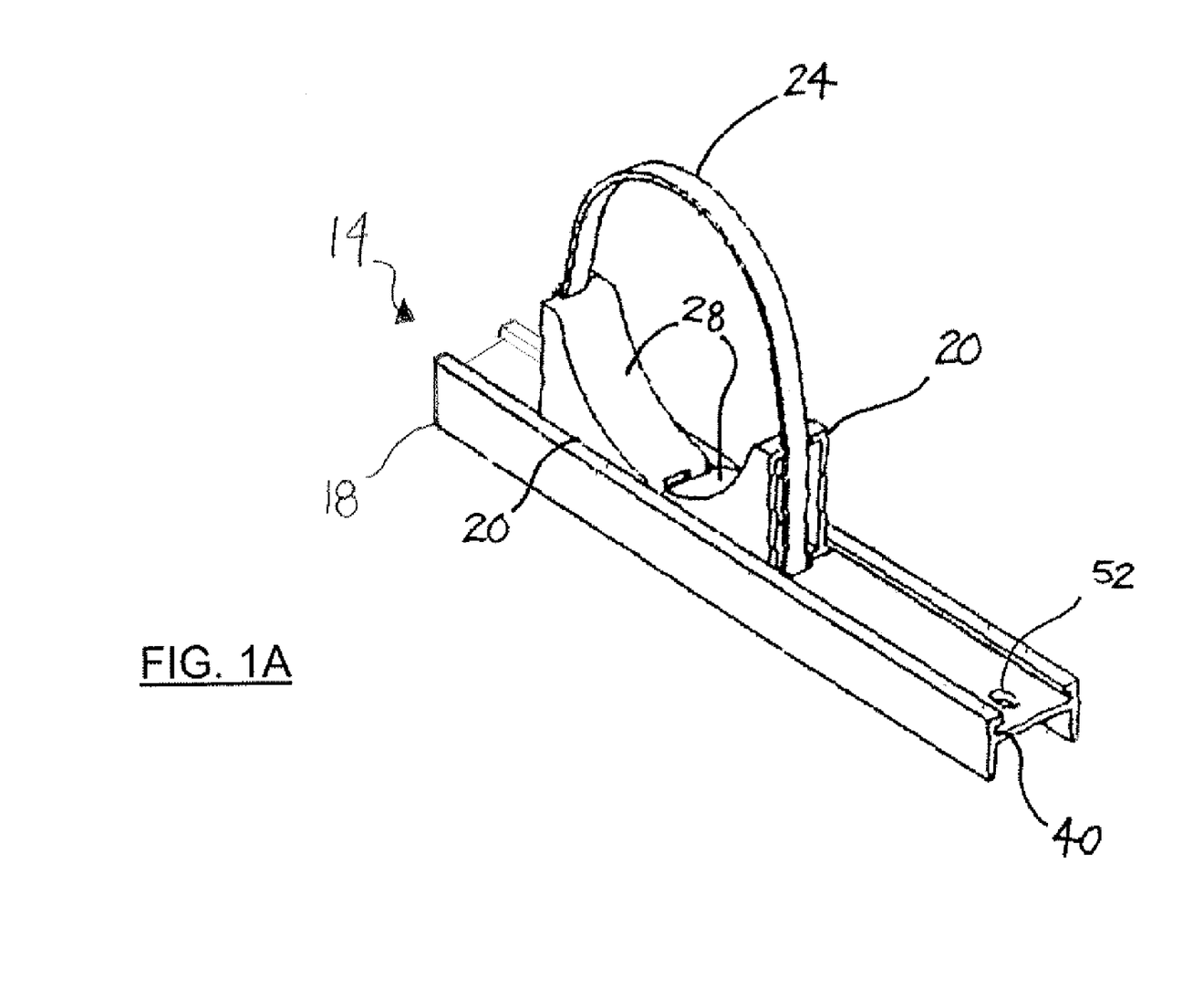
FIG. 1A is a perspective view of a variable-duct support assembly being configured for supporting one duct that has a circular cross-section, according to one advantageous embodiment of the invention.
Figure 1B:
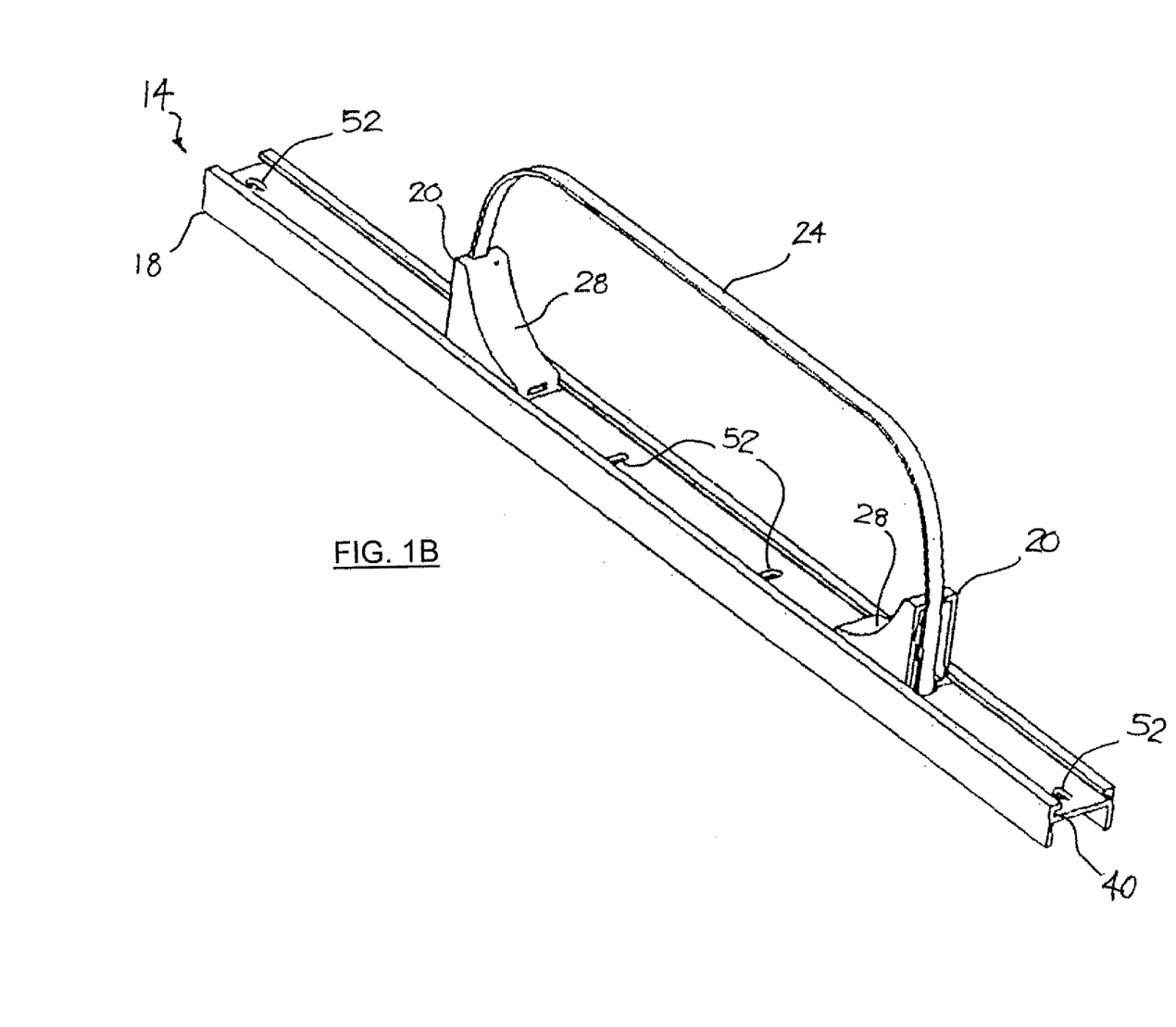
FIG. 1B is a perspective view of the variable-duct support assembly shown in FIG. 1B, being configured for supporting another duct that has an oval cross-section.

Referring to FIGS. 1A and 1B, there respectively are shown perspective views of a variable-duct support assembly 14 configured for supporting a duct having a circular cross-section and a duct having an oval cross-section, according to one advantageous embodiment of the invention. As detailed below, it will be appreciated that the variable-duct support assembly 14 can be configured for supporting various pluralities of sizes and shapes of ducts.

Figure 1C:
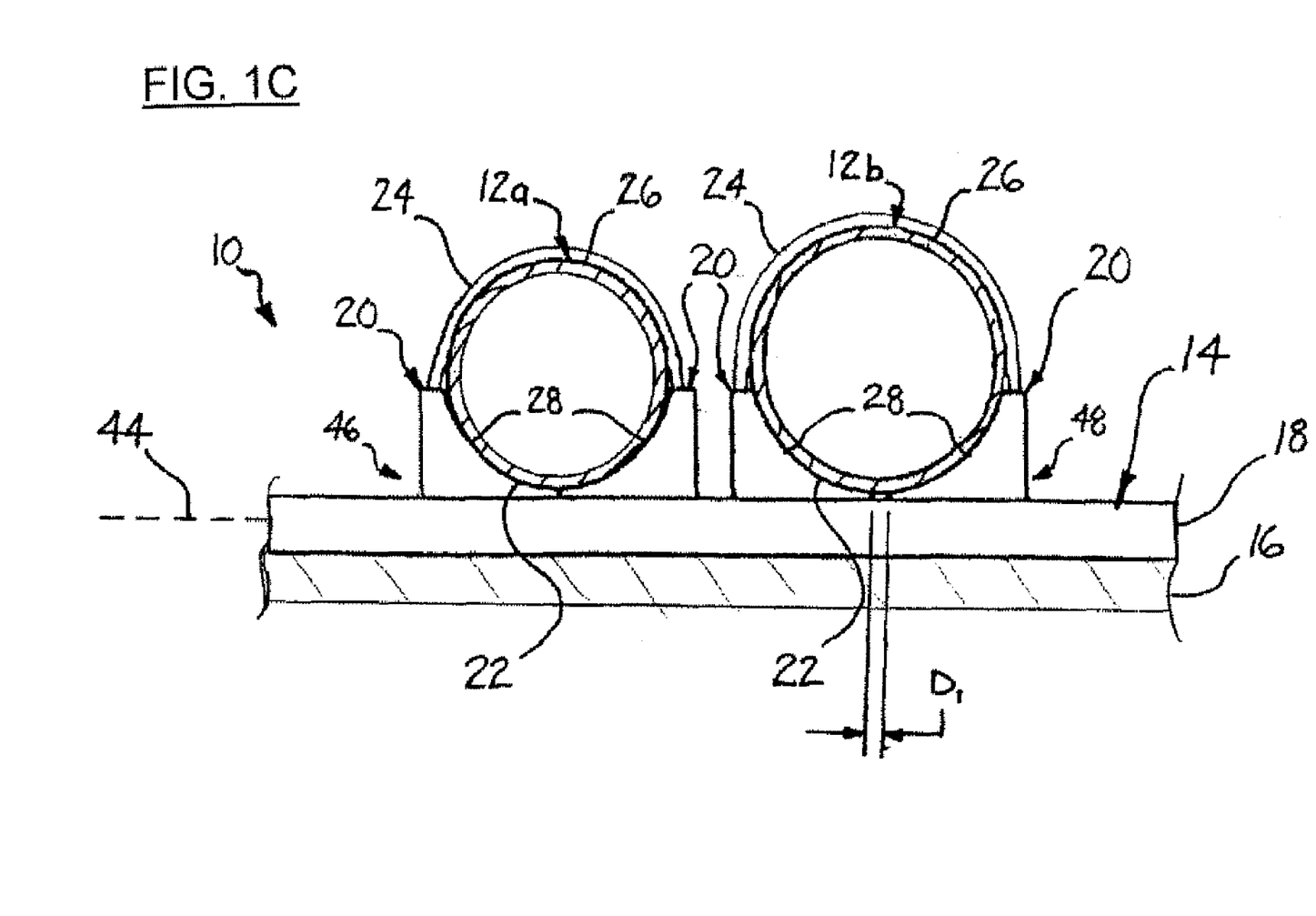
FIG. 1C is an end view of a duct assembly that includes two differently sized circular ducts and the variable-duct support assembly shown in FIGS. 1A and 1B being configured for supporting the ducts, according to one advantageous embodiment of the claimed invention.

Referring now to FIG. 1C, there generally is shown an end view of a duct assembly 10, which is comprised of two circular cross-sectional ducts 12a, 12b and a variable-duct support assembly 14 that is configured for mounting the ducts 12a, 12b onto a suitable portion of an airframe 16, according to one advantageous embodiments of the invention. In this example, the variable-duct support assembly 14 is configured for mounting a three-inch diameter duct 12a and a four-inch diameter duct 12b to the airframe 16. However, it is understood that the variable-duct support assembly can instead be configured for mounting various pluralities of shapes and sizes of the ducts.

Figure 1D:
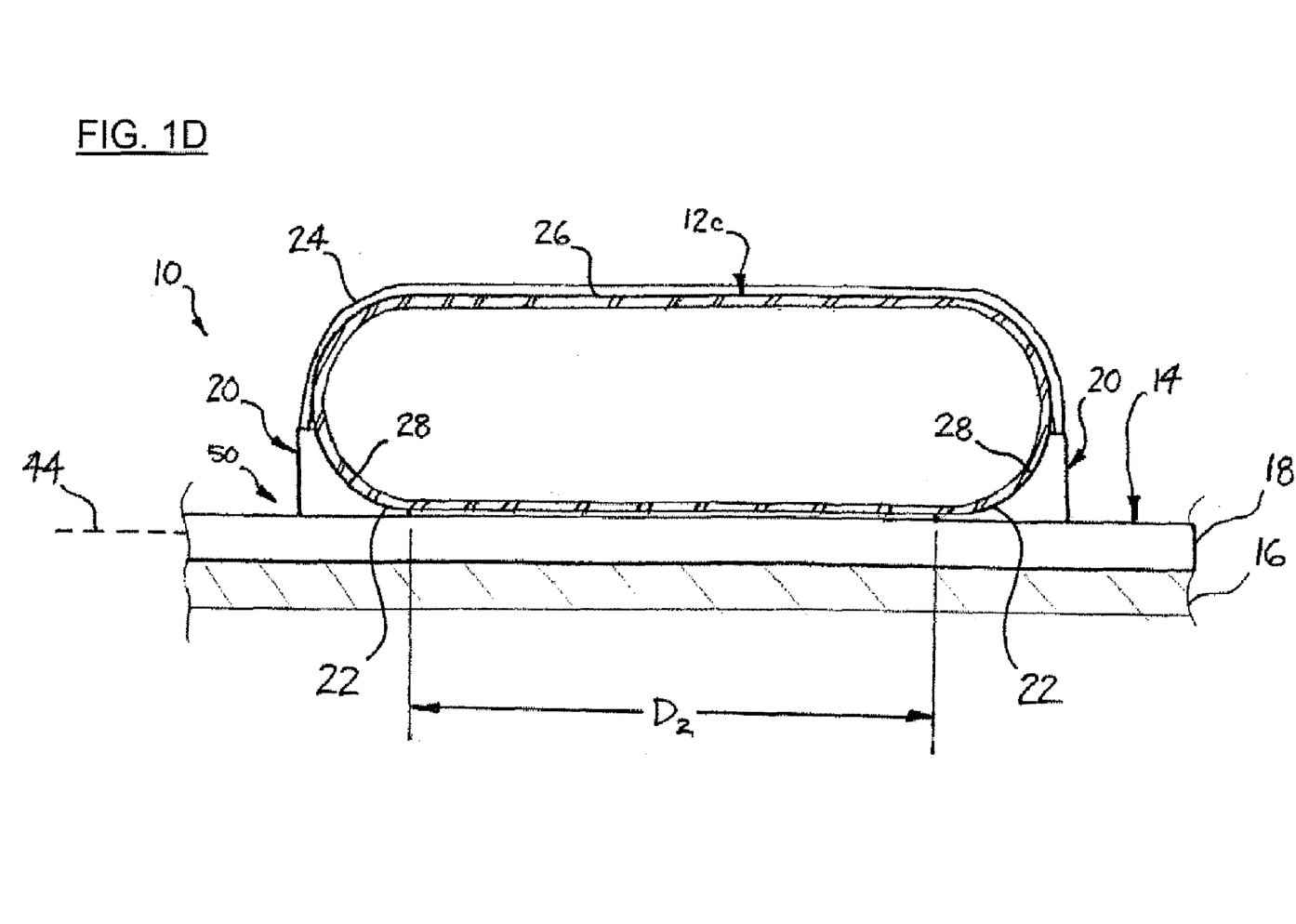
FIG. 1D is an end view of a duct assembly that includes one oval duct and the variable-duct support assembly shown in FIGS. 1A and 1B being configured for supporting the oval duct, according to another advantageous embodiment of the claimed invention.

For example, referring now to FIG. 1D, there is shown an end view of a duct assembly 10, which is comprised of one oval cross-sectional duct 12c and a variable-duct support assembly 14 that is configured for mounting the duct 12c onto a suitable portion of an airframe 16, according to another advantageous embodiments of the invention. In addition, it is also contemplated that the variable-duct support assembly 14 can be utilized for securing various other objects besides ducts onto other suitable structures, e.g. other vehicles and buildings.

Figure 2:
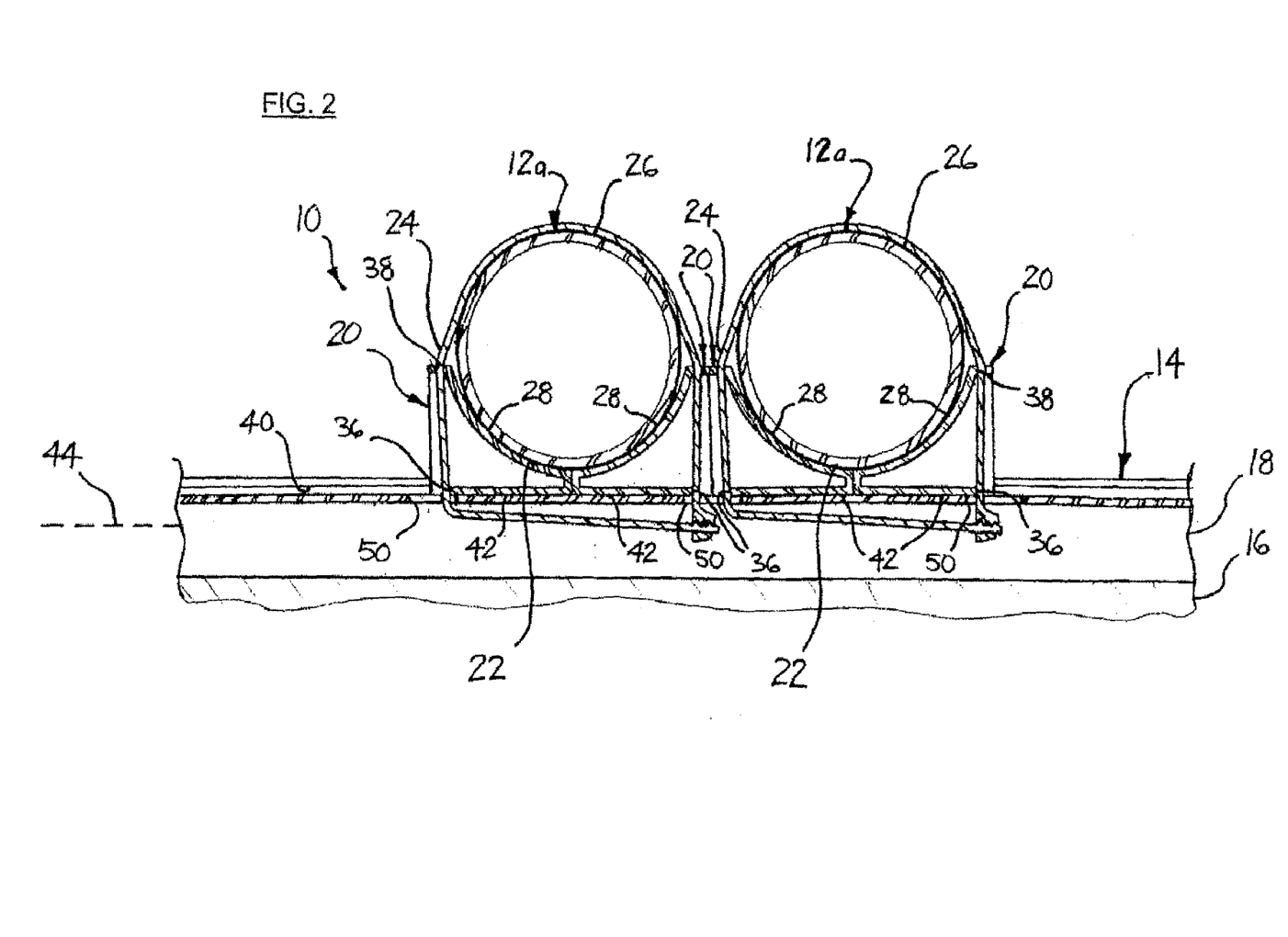
FIG. 2 is a cross-sectional view of the variable-duct support assembly shown in FIG. 1C and two similarly-sized ducts mounted to the variable-duct support assembly, according to another advantageous embodiment of the claimed invention.

Referring now to FIG. 2, there is shown a cross-sectional view of the variable-duct support assembly 14 shown in FIG. 1C for use in mounting two similarly sized and shaped ducts 12a, according to another advantageous embodiment of the invention.

As shown in FIGS. 1A-1D and 2, the variable-duct support assembly 14 generally includes a rail 18, which is adapted to be attached to the airframe 16 or other surface. The rail 18 has two pairs of support brackets 20 coupled thereto. However, it is contemplated that more or fewer support brackets 20 can be utilized as desired. Each pair of support brackets 20 is utilized for supporting a proximal surface 22 of the duct 12a and securing the duct 12a to the airframe 16 or other surface. Each of the pairs of support brackets 20 have a flexible band 24 coupled thereto and is positioned for contacting a distal surface 26 of the ducts 12 and clamping the respective ducts 12a between the flexible band 24 and the support brackets 20.

Figure 6:
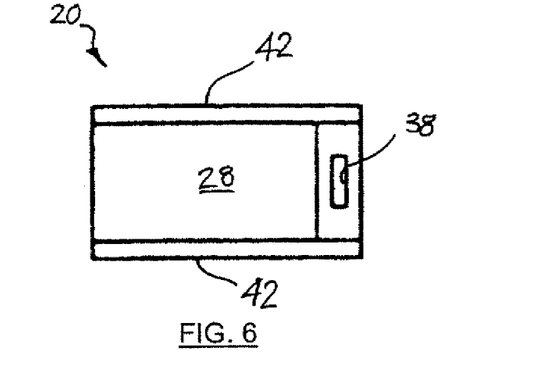
FIG. 6 is an top elevation view one of the support brackets shown in FIG. 5, as taken along arrow 6 shown in FIG. 5.
Figure 7:
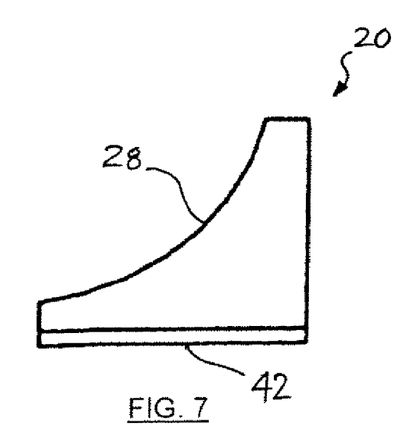
FIG. 7 is a side elevation view one of the support brackets shown in FIG. 5, as taken along arrow 7 shown in FIG. 5.
Figure 8:
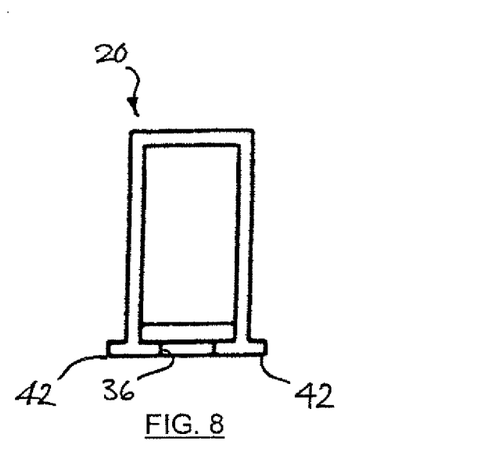
FIG. 8 is an axial elevation view one of the support brackets shown in FIG. 5, as taken along arrow 8 shown in FIG. 5.

Referring now to FIGS. 2, 6, and 7, each support bracket 20 has a support portion 28 for contacting a substantial amount of the duct's proximal surface 22. In this embodiment, the support portion 28 is a curved surface of the support bracket 20 itself. As best shown in FIGS. 1C and 1D, this curved surface has a predetermined radius of curvature for supporting circular, semi-circular, and/or oval ducts having contours within a predetermined range of diameters. For example, the curved surface can be sufficient for providing substantially distributed support to the proximal surfaces of circular cross-sectional ducts, which have diameters substantially within the range from three inches to four inches. However, it is contemplated that the support portion 28 can be shaped and sized for supporting ducts of various other shapes and sizes as desired. Moreover, as detailed in the description for FIG. 3, the support brackets 20 can be spaced apart from each other on the rail 18 for supporting various sized ducts.

Figure 9A:
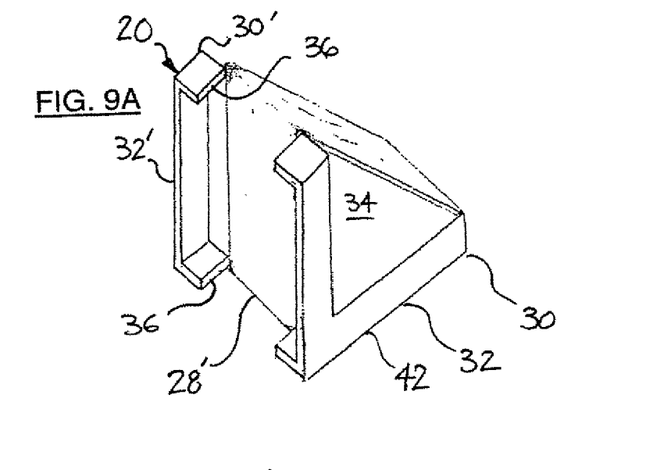
FIG. 9A is a perspective view of a support bracket, according to another advantageous embodiment of the invention.
Figure 9B:
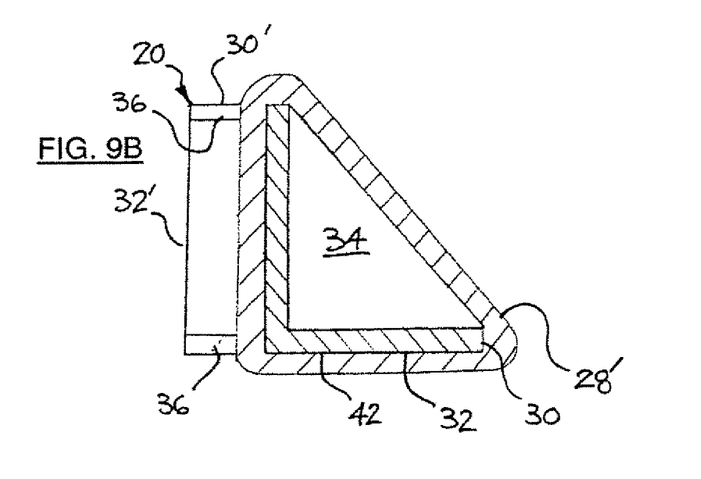
FIGS. 9B-9C are partially cutaway views of a duct assembly having the support bracket shown in FIG. 9A, respectfully illustrating a support portion of the support before and after contacting a proximal surface of the duct.
Figure 9C:
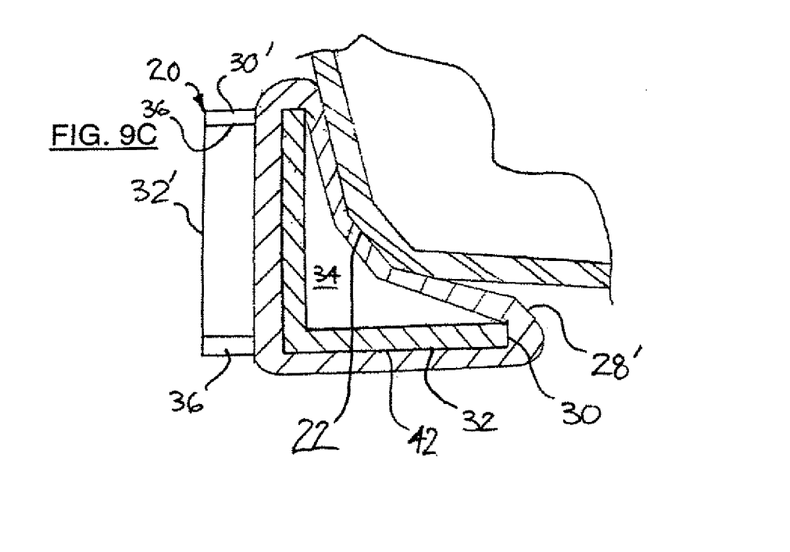

For instance, in another advantageous embodiment shown in FIGS. 9A-9C, the support portion 28" is a resilient belt member coupled to opposing ends 30, 30 of a support bracket 20. Specifically, FIG. 9B shows the resilient belt member prior to receiving the duct 12 thereon. Also, FIG. 9C shows the resilient belt member conforming to the proximal surface 22 of the duct 12 so as to distribute a load substantially across this proximal surface 22. In this embodiment, the support bracket 20 is comprised of two tab portions 32, 32" extending substantially perpendicularly from each other. These tab portions 32, 32" define a region of elasticity 34 within which the resilient belt member can stretch and conform to the duct's proximal surface 22. The resilient belt member is comprised of a rubber material or various other suitable materials which can conform to the proximal surface 22 of the duct 12 and still be sufficiently stiff for supporting the duct 12. In this way, the support portion 28 can distribute a load substantially across the proximal surface 22 of various shaped and sized ducts while minimizing the risk of inadvertently deforming those ducts.

In addition, each support bracket 20 is comprised of a plastic material and manufactured from an injection molding process. However, it will be appreciated that the support bracket can be comprised of various other suitable materials and made from other suitable manufacturing processes, namely a steelmaking process, a rolling process, a casting process, a forging process, an extrusion process, a drawing process, a welding process, or any combination thereof.

Referring now primarily to FIGS. 5-8, the flexible band 24 introduced hereinabove is coupled to each support bracket 20 via a notch 36 and an aperture 38 formed in the support bracket 20. Specifically, as best shown in FIG. 2, the flexible band 24 is a tie-wrap member passing through the notch 36 and the aperture 38. However, it is contemplated that the flexible band 24 can be a metal band, a rubber belt member, a woven fabric belt member, or various other suitable belt members. The notch 36 and the aperture 38 allow the flexible band 24 to attach to the support brackets 20 and wrap around both the support brackets 20 and the duct 12. For that reason, the flexible band 24 can clamp the duct 12 against the support brackets 20. It is understood that the flexible band 24 can be coupled to the support brackets in various other suitable ways as desired.

In addition, this flexible band 24 can conform to the distal surface 26 of the duct 12 and substantially distribute a load across the distal surface 26. In this regard, both the flexible band 24 and the support portion 28 of the support bracket 20 can be utilized in combination for distributing a clamping load across a substantial portion of the duct's perimeter. This feature is beneficial because it can decrease the likelihood of a load being concentrated on a discrete portion of the duct's perimeter, which can otherwise cause that portion to be inadvertently deformed.

Figure 3:
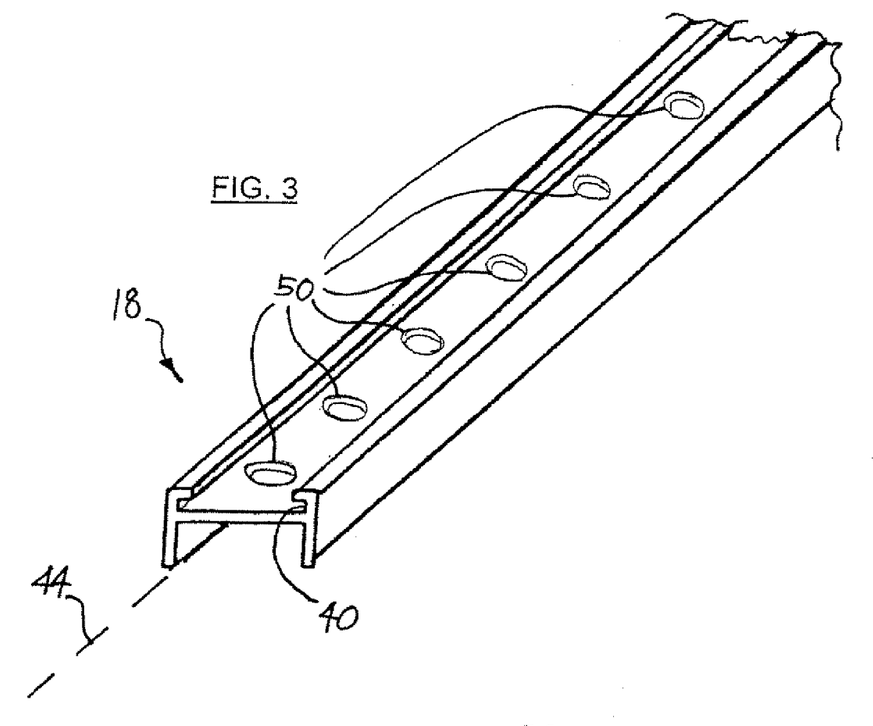
FIG. 3 is a partially cutaway perspective view of a rail of the duct assembly shown in FIG. 1C.

Referring now to FIG. 3, the rail 18 has a groove 40 formed therein for receiving the support brackets 20. The rail is preferably manufactured from an extrusion process. It will be appreciated that the rail can be comprised of a variety of suitable materials and be manufactured from other suitable processes, including a steelmaking process, a rolling process, a casting process, a forging process, an extrusion process, a drawing process, a welding process, or any combination thereof.

Figure 4:
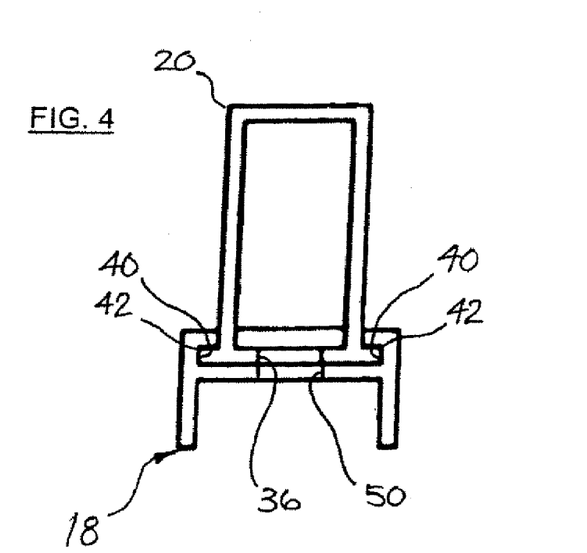
FIG. 4 is an axial view of a rail and a support bracket of the duct assembly shown in FIG. 1C.
Figure 5:
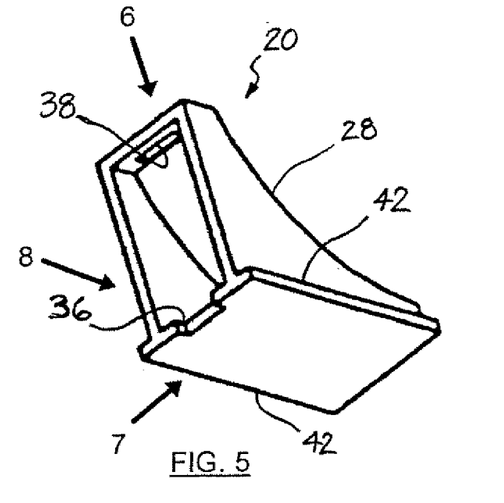
FIG. 5 is a perspective view one of the support brackets shown in FIG. 1C.

As best shown in FIG. 4, each support bracket 20 has a pair of flanges 42 extending therefrom for contacting the rail 18 within the groove 40 and providing a tongue-in-groove fitting between each support bracket and the rails 18. As exemplified in FIGS. 1C, 1D and 2, this tongue-in-groove fitting allows the identically shaped and sized support brackets 20 to be moved along a longitudinal axis 44 of the rail 18 and positioned relative to each other for supporting ducts 12 of various shapes and sizes. Specifically, with attention to FIG. 1C, a first pair 46 of support brackets 20 can directly abut each other for supporting a somewhat smaller-sized duct, e.g. a three-inch diameter duct. Moreover, a second pair 48 of support brackets 20 can be sufficiently spaced apart at a distance $D_1$ from each other for supporting a larger-sized duct, e.g. a four-inch diameter duct. Furthermore, referring now to FIG. 1D, a third pair 50 of support brackets 20 can be sufficiently spaced apart at a distance $D_2$ for supporting the oval cross-sectional duct 12. In each of these examples, the support brackets 20 are spaced from each other at a predetermined distance for placing the support portions 28 of the support brackets 20 in a sufficient position for contacting a maximum amount of the duct's proximal surface 22. In this way, as explained herein-above, those support portions 28 can distribute a load across a substantially large area of the duct's surface and decrease the likelihood of inadvertently deforming the duct 12. However, it is also understood that the support brackets 20 can be differently sized or shaped for supporting substantially larger or smaller ducts as desired.

As shown in FIGS. 2 and 3, each rail 18 further includes a series of openings 52 for passing the flexible band 24 therethrough and allowing the flexible band 24 to secure the support brackets 20 and the respective ducts in a predetermined position on the rail 18. These openings 52 can also be utilized for receiving various fasteners (not shown) that attach for the rail 18 to the airframe 16.

It will be appreciated that the duct assembly 10 can include substantially more than two rails 18 as desired, particularly when numerous lengthy and/or heavy ducts 12 require installation.

Figure 10:
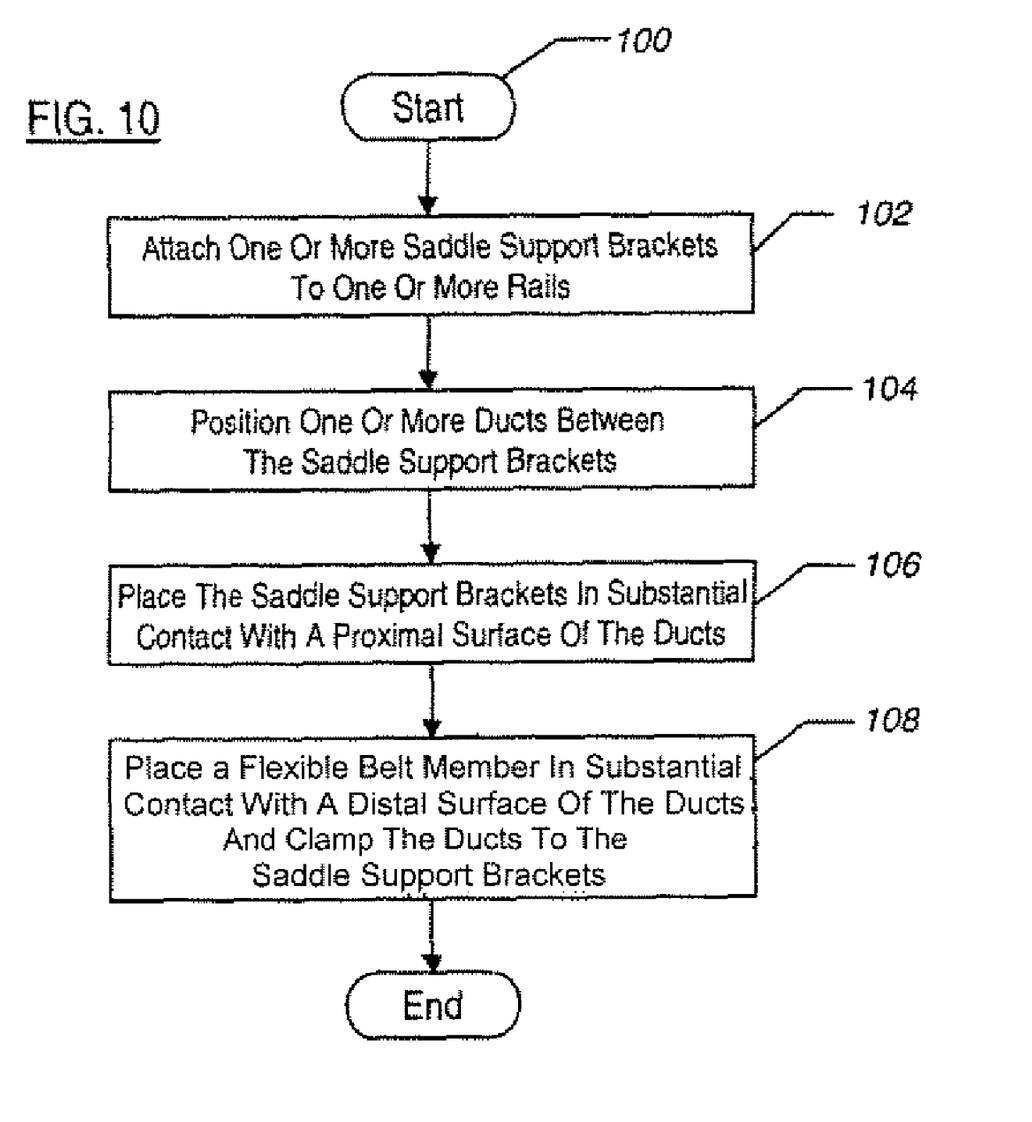
FIG. 10 is a logic flow diagram showing a method for installing a duct assembly in an airframe utilizing an embodiment of the present invention.

Referring now to FIG. 10, there is shown a logic flow diagram showing a method for producing a duct assembly, according to one advantageous embodiment of the invention. This method commences in step 100 and then immediately proceeds to step 102.

In step 102, one or more pairs of support brackets 20 are slidably attached to the rail 18. This step is accomplished by inserting flanges 42, which extend from the support brackets 20, into the groove 40, which is defined by the rail 18. However, it is contemplated that this step can be accomplished by various other suitable methods as desired. Then, the sequence proceeds to step 104.

In step 104, one or more ducts are positioned substantially between each pair of support brackets 20. This step can also require that the ducts are aligned substantially perpendicular to the rail 18. However, various other orientations can be utilized as desired. The sequence then proceeds to step 106.

In step 106, each pair of support brackets 20 is sufficiently positioned along the longitudinal axis 44 of the rail 18 to place support portions 28 of the support brackets 20 in contact with the proximal surface 22 of the duct 12. In this way, the support portions 28 can distribute a load across the proximal surface 22 and decrease the likelihood of inadvertently deforming the duct 12. This step is accomplished by sliding the support brackets 20 within the groove 40 of the rail 18. Yet, other methods for moving the support brackets 20 can be utilized as desired. Then, the sequence proceeds to step 108.

In step 108, one or more flexible bands 24 are attached to both the support brackets 20 and the rail 18 so as to clamp the duct 12 therebetween. As explained above, the flexible band 24 can be a tie wrap member that is secured to the support brackets 20 via the aperture 38 and the notch 36 formed in the support brackets 20. The tie-wrap member can be further secured to the rail 18 via the openings 52 formed in the rail 18. In this way, the flexible band 24 can conform to the distal surface 26 of the duct 12 and distribute a load substantially across the distal surface 26. This feature further decreases the likelihood of inadvertently deforming the duct 12. However, it is understood that the flexible band can instead be metal band, a woven cloth fabric member, a rubber belt member, or various other suitable belt members as desired. Furthermore, other suitable methods can be utilized for accomplishing this step.

While particular embodiments of the invention have been shown and described, numerous variations and alternate embodiments will occur to those skilled in the art. Accordingly, it is intended that the invention be limited only in terms of the appended claims.

The invention claimed is:

1. A variable duct support assembly for mounting a duct to an airframe of an aircraft, comprising:
   at least one rail having a groove;
   at least one pair of support brackets coupled to said at least one rail and positioned along said groove for supporting a proximal surface of the duct and sized and shaped for supporting ducts of various sizes and shapes; and
   at least one flexible resilient band coupled to said at least one pair of support brackets and conforming to the duct and clamping the duct therebetween, said at least one flexible resilient band being sufficiently stiff and supporting the duct for distributing a clamping load substantially across a distal surface of the duct;
   wherein said at least one pair of support brackets has a support portion distributing said clamping load substantially across said proximal surface of the various sized and shaped ducts, and
   wherein said at least one rail is secured to the airframe of said aircraft.

2. The variable-duct support assembly of claim 1 wherein said at least one rail has a series of openings formed therein for passing a series of fasteners therethrough and securing said at least one rail to the airframe.

3. The variable-duct support assembly of claim 1 wherein said at least one rail has a series of openings formed therein for passing said at least one flexible band therethrough and securing the duct to said at least one pair of support brackets and said at least one rail.

4. The variable-duct support assembly of claim 1 wherein each of said support brackets has at least one of a notch and an aperture formed therein for passing said flexible band therethrough and securing the duct to said at least one pair of support brackets.

5. The variable-duct support assembly of claim 1 wherein said at least one pair of support brackets is manufactured from a process selected from the group consisting of an injection molding process, a steelmaking process, a rolling process, a casting process, a forging process, an extrusion process, a drawing process, and a welding process.

6. The variable-duct support assembly of claim 1 wherein said at least one rail is manufactured from a process selected from the group consisting of an extrusion process, a steelmaking process, a rolling process, a casting process, a forging process, a drawing process, a welding process, and an injection molding process.

7. The variable-duct support assembly of claim 1 wherein said support portion of each of said support brackets has a substantially constant predetermined radius of curvature for supporting a plurality of ducts sized within a predetermined range of diameters.

8. The variable-duct support assembly of claim 1 wherein each of said support brackets has at least one flange extending therefrom for contacting said at least one rail within said groove and slidably coupling said support bracket to said at least one rail along a longitudinal axis of said at least one rail.

9. The variable-duct support assembly of claim 1 wherein said flexible band is selected from the group consisting of a tie-wrap member, metal band, a rubber belt member, and a woven fabric belt member.

10. A ductwork assembly for attachment to an airframe of an aircraft, comprising:
    a plurality of ducts oriented in a substantially parallel alignment, each of said plurality of ducts having a proximal surface and a distal surface;
    a plurality of variable-duct support assemblies each including at least one rail having a groove, at least one pair of support brackets coupled to said at least one rail, and at least one flexible resilient band coupled to said at least one pair of support brackets;
    wherein said at least one rail has a groove formed therein;
    wherein said at least one pair of support brackets is coupled to said at least one rail clamping the ducts therebetween and positioned along said groove for supporting said proximal surface of said plurality of ducts;
    wherein said at least one flexible resilient band is of sufficient thickness for supporting the ducts and is coupled to said at least one pair of support brackets with said plurality of ducts clamped therebetween, said at least one flexible resilient band contacting and wrapped substantially around said distal surface of each of said plurality of ducts so as to distribute a clamping load substantially across said distal surface;
    wherein each of said support brackets has a support portion for distributing said clamping load substantially across said proximal surface of the various sized and shaped ducts, and
    wherein said plurality of variable-duct support assemblies is attached to the airframe of the aircraft.

11. An aircraft, comprising:
    an airframe; and
    a ductwork assembly integrated within said airframe, said ductwork assembly including a plurality of ducts of various sizes and shapes and a plurality of variable-duct support assemblies for mounting said plurality of ducts to said airframe;
    wherein said plurality of ducts are oriented in a substantially parallel alignment, each of said plurality of ducts having a proximal surface and a distal surface;
    wherein said plurality of variable-duct support assemblies each include at least one rail having a groove, at least one pair of support brackets coupled to said at least one rail, and at least one flexible resilient band coupled to said at least one pair of support brackets;
    wherein said at least one rail has a groove formed therein;
    wherein said at least one pair of support brackets is coupled to said at least one rail and positioned along said groove for supporting said proximal surface of said plurality of ducts;
    wherein said at least one flexible resilient band is coupled to one of said at least one rail and said at least one pair of support brackets with said plurality of ducts clamped therebetween, said at least one flexible resilient band contacting and wrapped substantially around said distal surface of each of said plurality of ducts so as to distribute a clamping load substantially across said distal surface;
    wherein each of said support brackets has a support portion for distributing said clamping load substantially across said substantial portion of said proximal surface of various sized and shaped ducts, and
    wherein said plurality of variable-duct support assemblies are mounted to said airframe.

12. The aircraft of claim 11 wherein said at least one rail has a series of openings formed therein for passing said at least one flexible band therethrough and securing said plurality of ducts to said at least one pair of support brackets and said at least one rail.

13. The aircraft of claim 11 wherein each of said support brackets has at least one of a notch and an aperture formed therein for passing said flexible band therethrough and securing said plurality of ducts to said at least one pair of support brackets and said at least one tail.

14. The aircraft of claim 11 wherein said at least one pair of support brackets is manufactured from a process selected from the group consisting of an injection molding process, a steelmaking process, a rolling process, a casting process, a forging process, an extrusion process, a drawing process, and a welding process.

15. The aircraft of claim 11 wherein said at least one rail is manufactured from a process selected from the group consisting of an extrusion process, a steelmaking process, a rolling process, a casting process, a forging process, a drawing process, a welding process, and an injection molding process.

16. The aircraft of claim 11 wherein said support portion of each of said support brackets has a substantially constant predetermined radius of curvature for supporting said plurality of ducts each sized within a predetermined range of diameters.

17. The aircraft of claim 11 wherein each of said support brackets has at least one flange extending therefrom for contacting said at least one rail within said groove and slidably coupling said support bracket to said at least one rail along a longitudinal axis of said at least one rail.

18. The aircraft of claim 11 wherein said flexible band is selected from the group consisting of a tie-wrap member, metal band, a rubber belt member, and a woven fabric belt member.

19. A method for installing a ductwork assembly onto an airframe, comprising:
    attaching at least one pair of support brackets to at least one rail having a groove;
    positioning a proximal surface of at least one duct substantially between said at least one pair of support brackets;
    positioning at least one pair of said support brackets for distributing a clamping load across said proximal surface of said at least one duct;

attaching at least one flexible resilient band to at least one of said at least one rail and said at least one pair of support brackets so as to clamp said at least one duct therebetween;

wherein attaching said at least one flexible resilient band comprises contacting said distal surface and distributing said clamping load thereacross and attaching said ductwork assembly to said airframe.

20. The method of claim 19 wherein positioning said at least one duct comprises:

orienting said at least one duct substantially perpendicularly to said at least one rail.

21. The method of claim 19 wherein positioning said at least one pair of support brackets comprises:

sliding said at least one pair of support brackets within the groove defined by said at least one rail.

22. The method of claim 19 wherein attaching said at least one flexible band comprises:

coupling at least one of a tie-wrap member, metal band, a rubber belt member, and a woven fabric belt member to said at least one pair of support bracket so as to clamp said plurality of ducts therebetween.

* * * * *